Jan. 5, 1937.  E. A. MASSA, JR  2,066,942
ELECTRICAL MEASURING INSTRUMENT
Filed Nov. 2, 1934
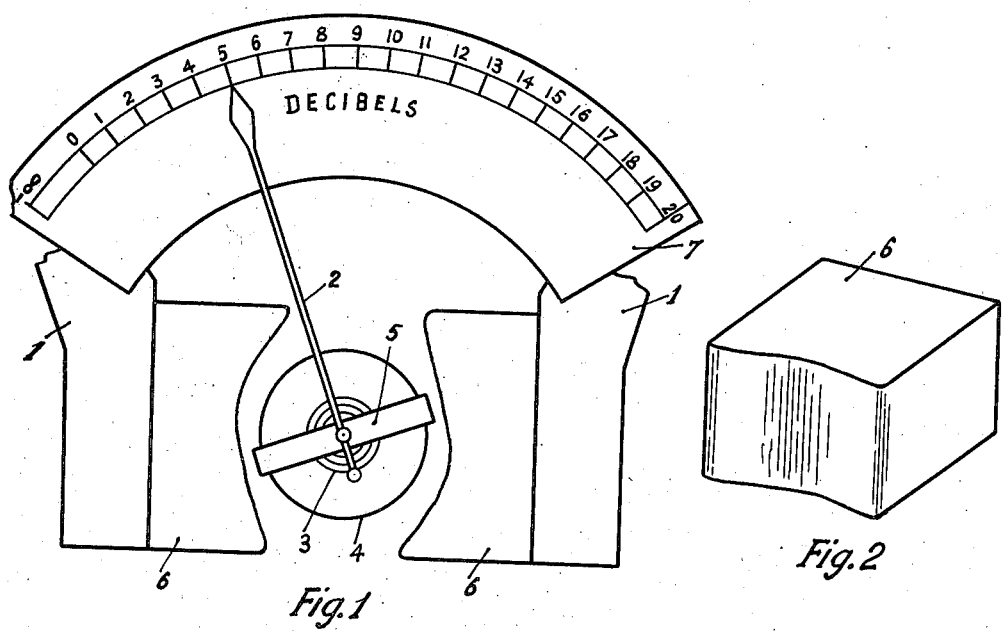
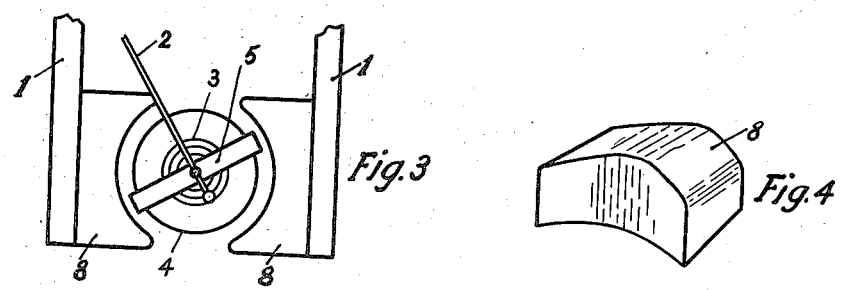
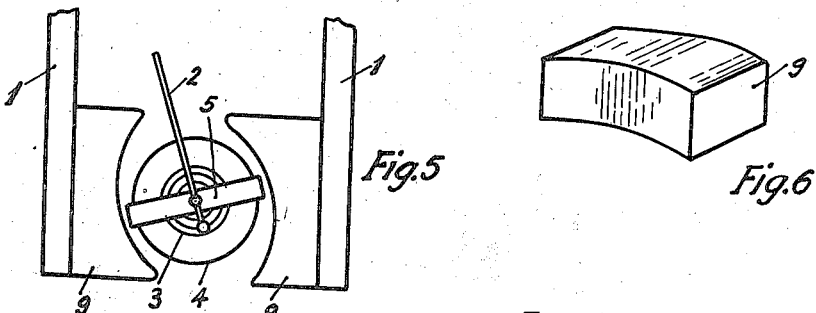
Inventor
Ernest Alfred Massa Jr Patented Jan. 5, 1937

2,066,942

UNITED STATES PATENT OFFICE 2,066,942

ELECTRICAL MEASURING INSTRUMENT

Ernest Alfred Massa, Jr., Haddon Heights, N. J., assignor of fifty-five per cent to Frank Massa, West Collingswood, N. J.

Application November 2, 1934, Serial No. 751,134

10 Claims. (Cl. 171—95)

My present invention is concerned with means for producing a uniform decibel scale on a direct current indicating meter. The primary object of my invention is to vary the flux density in the air gap of a direct current meter and/or to vary the effective length of wire in the meter coil which lies in the air gap, in a manner as shall be determined by the theoretical analysis which follows, such that a uniform decibel scale will result over the working range of the meter.

Due to the general use of the decibel, conventional types of electric meters are in widespread use in which the scale is calibrated to read directly in decibels above some arbitrary reference level. For such a calibration, the division spacing increases very rapidly in going up-scale on the meter, which results in a very crowded scale on the lower end of the meter and a very wide scale spacing on the other end. Such a scale obviously does not permit the readings to be made with the same precision at all points. My invention, by providing a uniformly spaced decibel scale, obviates this difficulty.

The description of my invention will be read in connection with the following figures: Fig. 1 shows an open face view of a direct current meter which embodies one form of my invention; Fig. 2 is a perspective view of the pole shoe used in Fig. 1; Fig. 3 shows a modification of the arrangement in Fig. 1; Fig. 4 shows a perspective view of the pole shoe used in Fig. 3; Fig. 5 shows another modification of the arrangement of Fig. 1; and Fig. 6 shows a perspective view of the pole shoe used in this latter arrangement.

Before describing practical means for accomplishing my purpose, I shall give a theoretical account of the factors involved. It is well known that a decibel defines the logarithmic ratio of two quantities and is a term that is widely used in specifying the power, voltage or current level in an electric circuit. Specifically, a decibel (db) is defined by the relation $$db = 10 \log \frac{P}{P_o} = 20 \log \frac{V}{V_o} = 20 \log \frac{I}{I_o} \quad (1)$$

where P=power being measured,
P₀=reference power,
V=voltage being measured,
V₀=reference voltage,
I=current being measured,
I₀=reference current.

Let the working range of the meter be designated as $\theta_o$ degrees and let $I_o$ be the current flowing through the meter coil at the beginning of the lower working end of the meter scale and let $I_m$ be the meter current at full scale deflection. It is evident that for the above conditions the decibel range of the meter, which I shall call N, will be $$N = 20 \log \frac{I_m}{I_o} \text{ decibels} \quad (2)$$

Since N decibels are to be uniformly distributed over $\theta_o$ degrees, it is obvious that the degrees per decibel which I shall call $\alpha$ will be $$\alpha = \frac{\theta_o}{N} \text{ degrees per decibel} \quad (3)$$

Let $\omega$ equal the number of degrees through which the meter coil moves from its position of rest for the current $I_o$ and let $(\theta + \omega)$ equal the angle through which the meter coil moves for a current having a magnitude of I.

The restoring force ($F_r$) due to the spiral spring acting on the coil suspension system is given by $$F_r = K_1(\theta + \omega) \quad (4)$$

where $K_1$=a constant.

The driving force ($F_d$) tending to turn the coil in the air gap is proportional to the flux density (B), the total length of conductor in the air gap (L), and the current through the coil (I), and may be expressed as $$F_d = K_2 BLI \quad (5)$$

where $K_2$=constant.

For equilibrium, $F_r$ must equal $F_d$, which means that $$K_1(\theta + \omega) = K_2 BLI \quad (6)$$

To get a uniform decibel scale over the working range of the meter, the following condition must be satisfied as I varies from $I_o$ to $I_m$ $$\theta = \alpha \left(20 \log \frac{I}{I_o}\right) \quad (7)$$

Substituting (7) in (6), I get the relation $$BL = K \frac{\alpha \left(20 \log \frac{I}{I_o}\right) + \omega}{I} \quad (8)$$

where K=a constant.

If the product of B times L in Equation (8) is satisfied for all values of I in the working range of the meter, it is obvious that the meter scale will have uniform decibel divisions over this range. I propose three methods for accomplishing this end which I shall describe below.

In my first arrangement I shall keep L constant and cause B to vary along the periphery of the air gap as determined by the right hand side of Equation (8). Fig. 1 shows the essential parts of the meter. A permanent magnet 1 supplies the magnetomotive force in the magnetic circuit. The air gap is formed between a fixed iron cylinder 4 and the pole shoes 6. A coil of wire 5 is mounted so that it is free to turn in the air gap, and when direct current is passed through the coil, electromagnetic forces will cause it to turn by an angle which is a function of the flux density, length of wire in the coil which resides in the gap, the current flowing and the stiffness of the restoring spring 3. A pointer 2 which is attached to the moving coil reads the deflection on a calibrated scale 7. Fig. 2 shows a perspective view of the pole shoe 6 which has had its face shaped so as to give the desired flux density variation indicated by Equation (8) with L assumed constant.

I have made a specific calculation to determine the shape of the pole piece 6 in order to give a uniform scale over a 20 decibel range for 90% of the complete range of a conventional D. C. milliammeter whose original scale was 0–30 milliamperes and whose uniform air gap was .042 inch. The total angular deflection of the meter was 112½° and 101¼° of this was divided into 20 uniform decibel divisions.

In terms of the symbols described above, I have the following constants for my specific problem $$\theta_o = 101\tfrac{1}{4}°$$
$$\alpha = \frac{101.25}{20} = 5\tfrac{1}{16}° \text{ per decibel}$$
$$\omega = 11\tfrac{1}{4}°$$

The further assumptions that I made are as follows: $I_0 = 1$ (an arbitrary value which only serves to get subsequent ratios).

The entire reluctance of the magnetic circuit appears in the air gap and the leakage flux does not contribute in determining the deflection of the meter coil.

Employing the above assumptions, it is obvious that the length of air gap will be inversely proportional to the flux density.

Using the symbols defined above, I have tabulated below the various quantities that I have computed from Equation (8).

| Decibels | I | (θ+ω) | Percent B | Air gap |
|---|---|---|---|---|
| −∞ | 0 | 0 | ------ | 0.0777 |
| 0 | 1 | 11.25 | 54.1 | .0600 |
| 1 | 1.12 | 16.31 | 70.0 | .0515 |
| 2 | 1.26 | 21.38 | 81.5 | .0468 |
| 3 | 1.42 | 26.44 | 89.6 | .0441 |
| 4 | 1.59 | 31.50 | 95.2 | .0427 |
| 5 | 1.78 | 36.56 | 98.5 | .0420 |
| 6 | 2.00 | 41.62 | 100 | .0420 |
| 7 | 2.25 | 46.69 | 100 | .0426 |
| 8 | 2.52 | 51.75 | 98.7 | .0434 |
| 9 | 2.83 | 56.81 | 96.6 | .0450 |
| 10 | 3.19 | 61.88 | 93.3 | .0468 |
| 11 | 3.59 | 66.94 | 89.7 | .0485 |
| 12 | 4.00 | 72.0 | 86.6 | .0511 |
| 13 | 4.51 | 77.1 | 82.2 | .0532 |
| 14 | 5.00 | 82.1 | 79.0 | .0562 |
| 15 | 5.60 | 87.2 | 74.8 | .0596 |
| 16 | 6.3 | 92.3 | 70.5 | .0638 |
| 17 | 7.1 | 97.3 | 65.9 | .0678 |
| 18 | 7.9 | 102.3 | 62.0 | .0724 |
| 19 | 8.9 | 107.4 | 58.0 | .0777 |
| 20 | 10 | 112.5 | 54.1 | .0777 |

The pole shoe faces were shaped to give the above listed values of air gap length at the various angular positions of the meter coil indicated in the center column of figures. After the magnetic structure was reassembled, I tested the scale and found that from 3 to 19 decibels the deflection of the meter was the same per decibel increase in current. Outside these limits, the deflections indicated that the leakage flux contributed to the air gap flux in affecting the reading. This error may be compensated for empirically by filing off the pole shoes to increase the air gap above the calculated values near the ends of the scale.

In my second arrangement for obtaining a uniform decibel scale over the meter range, I propose to vary L, which is the effective length of conductor being acted on by the air gap flux in Equation (8), and keep B constant. For accomplishing this objective, I propose to use the method shown in Fig. 3. Here the air gap is of constant length since the faces of the pole shoes 8 are concentric with the cylinder 4. To reduce the length of conductor which is acted on by the flux, the pole pieces 8 are chamfered as shown in Fig. 4.

The calculation of the height of the pole face at various positions of the meter coil may be made by using exactly the same procedure employed in the problem worked out above. In fact, by neglecting leakage flux, the fourth column of figures in the above table which is labeled "% B" are numerically equal to % height of pole face in this second case. If the pole shoes are chamfered according to these numerical values, it will be found that the leakage flux will be more effective in causing a departure from uniform decibel spacing on the extreme ends of the meter scale than occurred in the first case in which L was kept constant and B varied. The reason for this greater departure is due to the fact that in the extreme positions of the coil a much larger portion of conductor is exposed to leakage flux than in the first case mentioned above. It is possible, however, to increase the chamfer empirically near the ends to neutralize the leakage error and give the uniform scale which is desired.

In my third method for obtaining the desired objective, I propose to use a combination of the two methods described above. Both B and L are varied so that their product satisfies the relation shown in Equation (8).

Figs. 5 and 6 show one method of varying both B and L. In this particular arrangement, the pole shoes 9 have a cylindrical face whose curvature is eccentric with that of the cylinder 4. The eccentricity is such that the regions near the ends of the pole faces are farthest removed from the center of the cylinder 4. The center of curvature for the pole face may be placed wherever desired so that any predetermined part of the pole face may come in closest proximity with the cylinder 4.

The eccentric pole faces will cause a variation in flux along the air gap periphery. A variation in L is obtained by chamfering the poles as has already been mentioned. The amount of chamfering is made such that the product of BL will satisfy Equation (8).

Although only eccentric pole faces have been mentioned in this last case, it is obvious that many other shapes of surfaces may be employed without changing the fundamental principles of my invention.

In the above specification, I have shown how to obtain a linear variation in the angular deflections of a meter coil for logarithmic increases in the current flowing through the coil. It is perfectly obvious to anyone skilled in the art that a similar analysis may be made and the same practical means above disclosed may be employed for getting a linear variation in the angular deflections of a meter coil for any type of variation in coil current that may be mathematically expressed such as, for example, uniform angular deflections for square law variation in the coil current.

I claim as my invention:

1. In an electric meter comprised of a current carrying coil mounted in an air gap and whose meter scale divisions would be compressed toward one end if the air gap were uniform, means for causing the crowded portion of the scale to be expanded and the spread portion to be compressed, said means consisting of an air gap construction that will cause an increase in the total flux acting on the meter coil as the coil moves in from either end of its two extreme positions, said extreme positions defining the useful range of the meter.

2. In an electric meter comprised of a current carrying coil mounted so that it may move in an air gap, means for distributing the air gap flux so that uniform increments of motion will occur for unequal increments of current through the meter coil, said means consisting of an air gap construction which causes an increase in the total flux acting on the meter coil as the coil moves in from either end of its two extreme positions, said extreme positions defining the useful meter range over which the uniform scale results.

3. In an electric meter comprised of a current carrying coil mounted so that it may move in an air gap, means for distributing the air gap flux so that uniform increments of motion will occur for the meter coil for equal percentage increases in current through the coil, said means consisting of an air gap construction which causes an increase in the total flux acting on the meter coil during the first portion of its useful travel and then a decrease in the total flux acting on the coil with further increase in motion.

4. In an electric meter comprised of a current carrying coil mounted so that it may move in an air gap, means for causing uniform increments of motion of the meter coil for unequal increments of current through the meter coil, said means consisting of pole pieces so shaped that the average gap distance decreases during the first portion of the useful travel of the meter coil, reaches a minimum value, and then increases over the remaining useful travel of the meter coil.

5. In an electric meter comprised of a current carrying coil mounted so that it may move in an air gap, means for causing uniform increments of motion of the meter coil for equal percentage increases in the current through the meter coil, said means consisting of pole shoes so shaped that the average gap distance decreases during the first portion of the useful travel of the meter coil, reaches a minimum, and then increases over the remaining useful travel of the meter coil.

6. In an electric meter comprised of a current carrying coil mounted so that it may move in an air gap, means for causing uniform increments of motion of the meter coil for unequal increments of current through the meter coil, said means consisting of pole pieces so shaped that the average axial length of the air gap increases during the first portion of the useful travel of the meter coil, reaches a maximum value, and then decreases over the remaining useful travel of the meter coil.

7. In an electric meter comprised of a current carrying coil mounted so that it may move in an air gap, means for causing uniform increments of motion of the meter coil for equal percentage increases in the current through the meter coil, said means consisting of pole pieces so shaped that the average axial length of the air gap increases during the first portion of the useful travel of the meter coil, reaches a maximum value, and then decreases over the remaining useful travel of the meter coil.

8. In an electric meter, a pointer connected to a current carrying coil which is mounted so that it may move in an air gap, the air gap so constructed that the total flux acting on the meter coil increases as the coil moves in from either end of its extreme positions, said air gap construction resulting in uniform increments of motion of the meter coil for unequal increments of current through the coil, and a scale over which the pointer rides which has equally spaced divisions over the larger portion of its total range.

9. In an electric meter, a pointer connected to a current carrying coil which is mounted so that it may move in an air gap, the air gap so constructed that the total flux acting on the meter coil increases as the coil moves in from either end of its extreme positions, said air gap construction resulting in uniform increments of motion for equal percentage increases in the meter coil current, and a scale over which the pointer rides which has equally spaced divisions over the larger portion of its range, each division representing the same decibel increase in the meter current.

10. In an electric meter comprised of a current carrying coil mounted so that it may move in an air gap, means for distributing the air gap flux so that uniform increments of motion will occur for the meter coil for equal percentage increases in current through the coil, said means consisting of an air gap construction which satisfies the relation:

$$BL = K \frac{\alpha\left(20 \log \frac{I}{I_0}\right) + \omega}{I}$$

where B = Flux density in the air gap acting on the meter coil,
L = Total length of conductor in the meter coil being acted on by the air gap flux,
I = current through the meter coil,
$I_0$ = current through the meter coil at the beginning of the lower working end of the uniform meter scale,
K = a constant,
$\alpha$ = degrees deflection of the meter coil per decibel change in the meter coil current,
$\omega$ = degrees deflection of the meter coil from its position of rest caused by the current $I_0$.

ERNEST ALFRED MASSA, Jr.